United States Patent
Yiu et al.

(10) Patent No.: US 10,237,680 B2
(45) Date of Patent: Mar. 19, 2019

(54) INCREASED CARRIER MONITORING

(71) Applicant: INTEL IP CORPORATION, Santa Clara, CA (US)

(72) Inventors: Candy Yiu, Portland, OR (US); Yang Tang, Pleasanton, CA (US); Hyung-Nam Choi, Hamburg (DE); Richard Burbidge, Shrivenham (GB); Youn Hyoung Heo, Seoul (KR)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/512,822

(22) PCT Filed: Jun. 30, 2015

(86) PCT No.: PCT/US2015/038674
§ 371 (c)(1),
(2) Date: Mar. 20, 2017

(87) PCT Pub. No.: WO2016/048429
PCT Pub. Date: Mar. 31, 2016

(65) Prior Publication Data
US 2017/0251511 A1    Aug. 31, 2017

Related U.S. Application Data

(60) Provisional application No. 62/056,289, filed on Sep. 26, 2014.

(51) Int. Cl.
*H04W 72/04* (2009.01)
*H04W 4/02* (2018.01)
(Continued)

(52) U.S. Cl.
CPC ............. *H04W 4/02* (2013.01); *H04L 5/0012* (2013.01); *H04W 24/10* (2013.01); *H04W 36/0094* (2013.01); *H04W 76/16* (2018.02)

(58) Field of Classification Search
CPC ...... H04L 5/001; H04L 5/0012; H04L 5/0053; H04L 5/0091; H04L 5/14; H04W 24/08;
(Continued)

(56) References Cited

U.S. PATENT DOCUMENTS 9,008,583 B2    4/2015 Shi et al.
2010/0254315 A1*  10/2010 Zhao .................... H04L 5/1453
                                                                                370/328
(Continued)

FOREIGN PATENT DOCUMENTS

JP    H10-503356 A    3/1998
RU    2524682 C2      8/2014
(Continued)

OTHER PUBLICATIONS

Ericsson et al; 3GPP TSG-WG2 Meeting #87; R2-143809; Introduction of increased number of frequencies to monitor; Dresden, Germany; Aug. 18-22, 2014.
(Continued)

*Primary Examiner* — Quan M Hua
(74) *Attorney, Agent, or Firm* — Thorpe North & Western

(57) ABSTRACT

Technology described herein provides carrier-monitoring (CM) signaling approaches that can be used by networks and/or mobile devices. An evolved Node B (eNB) can send an IncMon-support message indicating whether a network supports the increased-number-of-frequencies-to-monitor (IncMon) feature. A UE can apply a default CM configuration if the UE does not receive an IncMon-support message from the eNB. The eNB can use dedicated signaling or broadcast signaling to inform a UE of a default CM configuration or one or more adopted CM configurations that are used in the network. The eNB can also send a list of carriers that are to be monitored to the UE. The UE can also send UE-capability information to the eNB, such as a default
(Continued)

CM configuration, an adopted CM configuration, or configurable configurations in different radio access technologies (RATs) supported by the UE.

23 Claims, 7 Drawing Sheets

(51) Int. Cl.
*H04W 24/10* (2009.01)
*H04W 36/00* (2009.01)
*H04L 5/00* (2006.01)
*H04W 76/16* (2018.01)

(58) Field of Classification Search
CPC ... H04W 24/10; H04W 36/0094; H04W 4/02; H04W 72/04; H04W 76/026; H04W 88/02; H04W 88/08
See application file for complete search history.

(56) References Cited

U.S. PATENT DOCUMENTS

| | | |
|---|---|---|
| 2011/0244806 A1 | 10/2011 | Gomes et al. |
| 2012/0057527 A1 | 3/2012 | Ou |
| 2012/0178465 A1* | 7/2012 | Lin ........................ H04W 24/10 455/450 |
| 2013/0028184 A1* | 1/2013 | Lee ......................... H04W 8/22 370/328 |
| 2013/0039232 A1* | 2/2013 | Kim ......................... H04L 5/14 370/280 |
| 2013/0244664 A1 | 9/2013 | Song et al. |
| 2013/0344869 A1* | 12/2013 | Yamada ............ H04W 36/0094 455/436 |
| 2014/0087715 A1 | 3/2014 | Suzuki et al. |

FOREIGN PATENT DOCUMENTS

| | | |
|---|---|---|
| WO | WO 96/37084 A1 | 11/1996 |
| WO | WO 2010/032675 A1 | 3/2010 |
| WO | WO 2013/059933 A1 | 5/2013 |

OTHER PUBLICATIONS

3GPP TS 36.331 V12.0.0: Evolved Universal Terrestrial Radio Access (E-UTRA); Radio Resource Control (RRC); Protocol specification (Release 12) (Dec. 2013).
3GPP TS 36.133 V12.0.0: Evolved Universal Terrestrial Radio Access (E-UTRA); Requirements for support of radio resource management (Release 12) (Jul. 2013).
Ericsson; "UE Capability for IncMon"; 3GPP TSG R2-143415; (Aug. 18-22, 2014); 14 pages; WG2 Meeting #87, Dresden, Germany; 36.331 CR V12.2.0 (Rel-12).
Ericsson; "UE capability for increased number of frequencies to monitor"; 3GPP TSG R2-143582; (Aug. 18-22, 2014); 3 pages; RAN WG2 #87, Dresden, Germany; (Agenda: 5.2 WI: Increasing the minimum number of carriers for UE monitoring in UTRA and E-UTRA).
Broadcom Corporation; "Discussion on the open issues of increased number of carriers for UE monitoring"; 3GPP TSG R4-71AH-0052; (Jun. 24-26, 2014); 5 pages; RAN WG4 Meeting #71 —RRM AH, Beijing, P.R. China; (Agenda 6.1).
Catt; "Scaling factors of RRM requirements for LTE_UTRA_IncMon-Core for E-UTRA"; 3GPP TSG R4-144269; (Aug. 18-22, 2014); RAN WG4 Meeting #72, Dresden, Germany; (Agenda: 7.8.3).
Intel Corporation; "Discussion on increasing the minimum number of carriers for UE monitoring in EU TRA RRC_Connected state"; 3GPP TSG R4-145267; (Aug. 18-22, 2014); 6 pages; RAN WG4 Meeting #72, Dresden, Germany; (Agenda: 7.8.1).
Samsung: "Remaining issues on increased carrier monitoring"; 3GPP TSG R2-143514; (Aug. 18-22, 2014); 3 pages; RAN WG2 Meeting #87, Dresden, Germany; (Agenda 5.2).

* cited by examiner

*MeasConfig information element*

```
-- ASN1START
MeasConfig ::=                  SEQUENCE {
    -- Measurement objects
    measObjectToRemoveList          MeasObjectToRemoveList          OPTIONAL,   -- Need ON
    measObjectToAddModList          MeasObjectToAddModList          OPTIONAL,   -- Need ON
    -- Reporting configurations
    reportConfigToRemoveList        ReportConfigToRemoveList        OPTIONAL,   -- Need ON
    reportConfigToAddModList        ReportConfigToAddModList        OPTIONAL,   -- Need ON
    -- Measurement identities
    measIdToRemoveList              MeasIdToRemoveList              OPTIONAL,   -- Need ON
    measIdToAddModList              MeasIdToAddModList              OPTIONAL,   -- Need ON
    -- Other parameters
    quantityConfig                  QuantityConfig                  OPTIONAL,   -- Need ON
    measGapConfig                   MeasGapConfig                   OPTIONAL,   -- Need ON
    s-Measure                       RSRP-Range                      OPTIONAL,   -- Need ON
    preRegistrationInfoHRPD         PreRegistrationInfoHRPD         OPTIONAL,   -- Need OP
    speedStatePars              CHOICE {
        release                         NULL,
        setup                           SEQUENCE {
            mobilityStateParameters         MobilityStateParameters,
            timeToTrigger-SF                SpeedStateScaleFactors
        }
    }                                                               OPTIONAL,   -- Need ON
    ...,
    [[ measObjectToAddModList-v9e0    MeasObjectToAddModList-v9e0   OPTIONAL    -- Need ON
    ]],
    [[ measurement-SF                 MeasurementScaleFactor-r12    OPTIONAL,   -- Cond RPG
       measIdToRemoveList-v12xy       MeasIdToRemoveList-v12xy      OPTIONAL,   -- Need ON
       measIdToAddModList-v12xy       MeasIdToAddModList-v12xy      OPTIONAL    -- Need ON
    ]],
    [[ defaultConfigIncMon-v12xy      ENUMERATED (true)             OPTIONAL    -- Need
    ]]
}

MeasIdToRemoveList ::=          SEQUENCE (SIZE (1..maxMeasId)) OF MeasId

MeasIdToRemoveList-v12xy ::=    SEQUENCE (SIZE (1..maxMeasId)) OF MeasId-v12xy

MeasObjectToRemoveList ::=      SEQUENCE (SIZE (1..maxObjectId)) OF MeasObjectId ReportConfigToRemoveList ::=    SEQUENCE (SIZE (1..maxReportConfigId)) OF ReportConfigId

-- ASN1STOP
```

| MeasObjectEUTRA field descriptions |
|---|
| altTTT-CellsToAddModList |
| List of cells to add/ modify in the cell list for which the alternative time to trigger specified by *alternativeTimeToTrigger* in *reportConfigEUTRA*, if configured, applies. |
| altTTT-CellsToRemoveList |
| List of cells to remove from the list of cells for alternative time to trigger. |
| blackCellsToAddModList |
| List of cells to add/ modify in the black list of cells. |
| blackCellsToRemoveList |
| List of cells to remove from the black list of cells. |
| carrierFreq |
| Identifies E-UTRA carrier frequency for which this configuration is valid. E-UTRAN does not configure more than one measurement object for the same physical frequency regardless of the EARFCN used to indicate this. |
| cellIndex |
| Entry index in the cell list. An entry may concern a range of cells, in which case this value applies to the entire range. |
| cellIndividualOffset |
| Cell individual offset applicable to a specific cell. Value dB24 corresponds to -24 dB, dB-22 corresponds to -22 dB and so on. |
| cellsToAddModList |
| List of cells to add/ modify in the cell list. |
| cellsToRemoveList |
| List of cells to remove from the cell list. |
| *defaultConfigIncMon-v12xy* ⟵ 202 |
| default configuration is used for increasing the number of carriers for UE monitoring following specification 36.133 |
| measCycleSCell |
| The parameter is used only when an SCell is configured on the frequency indicated by the *measObject* and is in deactivated state, see TS 36.133 [16, 8.3.3]. E-UTRAN configures the parameter whenever an SCell is configured on the frequency indicated by the *measObject*, but the field may also be signalled when an SCell is not configured. Value *sf160* corresponds to 160 sub-frames, *sf256* corresponds to 256 sub-frames and so on. |
| measSubframeCellList |
| List of cells for which *measSubframePatternNeigh* is applied. |
| measSubframePatternNeigh |
| Time domain measurement resource restriction pattern applicable to neighbour cell RSRP and RSRQ measurements on the carrier frequency indicated by *carrierFreq*. For cells in *measSubframeCellList* the UE shall assume that the subframes indicated by *measSubframePatternNeigh* are non-MBSFN subframes. |
| reducedMeasurementPerformance |
| Value TRUE indicates that the EUTRA carrier frequency is configured for reduced measurement performance, see TS 36.133 [16]. If the field is not included, the neighbouring inter-frequency is configured for normal measurement performance, see TS 36.133 [16]. |
| offsetFreq |
| Offset value applicable to the carrier frequency. Value dB24 corresponds to -24 dB, dB-22 corresponds to -22 dB and so on. |
| physCellId |
| Physical cell identity of a cell in the cell list. |
| physCellIdRange |
| Physical cell identity or a range of physical cell identities. |
| t312 |
| The value of timer T312. Value *ms0* represents 0 ms, *ms50* represents 50 ms and so on. |
| widebandRSRQ-Meas |
| If this field is set to *TRUE*, the UE shall, when performing RSRQ measurements, use a wider bandwidth in accordance with TS 36.133 [16]. |

FIG. 2

*MeasConfig* information element

```
-- ASN1START

MeasConfig ::=                          SEQUENCE {
    -- Measurement objects
    measObjectToRemoveList              MeasObjectToRemoveList              OPTIONAL,       -- Need ON
    measObjectToAddModList              MeasObjectToAddModList              OPTIONAL,       -- Need ON
    -- Reporting configurations
    reportConfigToRemoveList            ReportConfigToRemoveList            OPTIONAL,       -- Need ON
    reportConfigToAddModList            ReportConfigToAddModList            OPTIONAL,       -- Need ON
    -- Measurement identities
    measIdToRemoveList                  MeasIdToRemoveList                  OPTIONAL,       -- Need ON
    measIdToAddModList                  MeasIdToAddModList                  OPTIONAL,       -- Need ON
    -- Other parameters
    quantityConfig                      QuantityConfig                      OPTIONAL,       -- Need ON
    measGapConfig                       MeasGapConfig                       OPTIONAL,       -- Need ON
    s-Measure                           RSRP-Range                          OPTIONAL,       -- Need ON
    preRegistrationInfoHRPD             PreRegistrationInfoHRPD             OPTIONAL,       -- Need OP
    speedStatePars              CHOICE {
        release                             NULL,
        setup                               SEQUENCE {
            mobilityStateParameters             MobilityStateParameters,
            timeToTrigger-SF                    SpeedStateScaleFactors
        }
    }                                                                       OPTIONAL,       -- Need ON
    ...,
    [[ measObjectToAddModList-v9e0       MeasObjectToAddModList-v9e0 OPTIONAL       -- Need ON
    ]],
    [[ measurement-SF                    MeasurementScaleFactor-r12  OPTIONAL,      -- Cond RPG
       measIdToRemoveList-v12xy          MeasIdToRemoveList-v12xy    OPTIONAL,      -- Need ON
       measIdToAddModList-v12xy          MeasIdToAddModList-v12xy    OPTIONAL       -- Need ON
    ]],
    [[ defaultConfigIncMon-v12xy         ENUMERATED {true}           OPTIONAL,      -- Need
       preConfigIncMon-v12xy             ENUMERATED {true}           OPTIONAL       -- Need
    ]]
}

MeasIdToRemoveList ::=              SEQUENCE (SIZE (1..maxMeasId)) OF MeasId

MeasIdToRemoveList-v12xy ::=        SEQUENCE (SIZE (1..maxMeasId)) OF MeasId-v12xy MeasObjectToRemoveList ::=          SEQUENCE (SIZE (1..maxObjectId)) OF MeasObjectId ReportConfigToRemoveList ::=        SEQUENCE (SIZE (1..maxReportConfigId)) OF ReportConfigId

-- ASN1STOP
```

FIG. 3

*MeasConfig* information element

```
-- ASN1START

MeasConfig ::=                      SEQUENCE {
    -- Measurement objects
    measObjectToRemoveList          MeasObjectToRemoveList          OPTIONAL,   -- Need ON
    measObjectToAddModList          MeasObjectToAddModList          OPTIONAL,   -- Need ON
    -- Reporting configurations
    reportConfigToRemoveList        ReportConfigToRemoveList        OPTIONAL,   -- Need ON
    reportConfigToAddModList        ReportConfigToAddModList        OPTIONAL,   -- Need ON
    -- Measurement identities
    measIdToRemoveList              MeasIdToRemoveList              OPTIONAL,   -- Need ON
    measIdToAddModList              MeasIdToAddModList              OPTIONAL,   -- Need ON
    -- Other parameters
    quantityConfig                  QuantityConfig                  OPTIONAL,   -- Need ON
    measGapConfig                   MeasGapConfig                   OPTIONAL,   -- Need ON
    s-Measure                       RSRP-Range                      OPTIONAL,   -- Need ON
    preRegistrationInfoHRPD         PreRegistrationInfoHRPD         OPTIONAL,   -- Need OP
    speedStatePars          CHOICE {
        release                     NULL,
        setup                       SEQUENCE {
            mobilityStateParameters     MobilityStateParameters,
            timeToTrigger-SF            SpeedStateScaleFactors
        }
    }                                                               OPTIONAL,   -- Need ON
    ...,
    [[ measObjectToAddModList-v9e0  MeasObjectToAddModList-v9e0 OPTIONAL        -- Need ON
    ]],
    [[ measurement-SF               MeasurementScaleFactor-r12  OPTIONAL,       -- Cond RPG
       measIdToRemoveList-v12xy     MeasIdToRemoveList-v12xy    OPTIONAL,       -- Need ON
       measIdToAddModList-v12xy     MeasIdToAddModList-v12xy    OPTIONAL        -- Need ON
    ]],
    [[ configIncMon-v12xy           ENUMERATED {default,preConfig}  OPTIONAL    -- Need
    ]]
}

MeasIdToRemoveList ::=              SEQUENCE (SIZE (1..maxMeasId)) OF MeasId

MeasIdToRemoveList-v12xy ::=        SEQUENCE (SIZE (1..maxMeasId)) OF MeasId-v12xy MeasObjectToRemoveList ::=          SEQUENCE (SIZE (1..maxObjectId)) OF MeasObjectId ReportConfigToRemoveList ::=        SEQUENCE (SIZE (1..maxReportConfigId)) OF ReportConfigId

-- ASN1STOP
```

FIG. 4

INCREASED CARRIER MONITORING

BACKGROUND

The number of wireless devices (e.g., cellular phones and tablet computers) in use that connect to cellular networks has increased greatly over the past decade. Many of these wireless devices conform to existing standards established by the Third Generation Partnership Project (3GPP) requiring that up to three carrier frequencies be monitored by a device in a connected mode. The evolved universal terrestrial radio access network (E-UTRAN) or Long Term Evolution (LTE) standard established by the 3GPP, however, has been designed to be very flexible with regard to the frequency bands to provide desired bandwidth. Consequently, the number of frequency bands and frequency band combinations supported by a modern cellular device that can be very high. In order to meet today's increasing demand for fast wireless data transfer over cellular networks, the number of deployed bands and frequencies has increased significantly in recent years. As a result, minimum requirements that were established when fewer bands and frequencies were in use may ultimately be unnecessarily limiting for more modern wireless devices that support using a greater numbers of carriers.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1 illustrates exemplary code describing a modified Measurement-Configuration (MeasConfig) information element (IE) in accordance with an example;

FIG. 2 illustrates a table containing exemplary field descriptions for a measObjectEUTRA information element (IE) in accordance with an example;

FIG. 3 illustrates exemplary code describing another example of a modified MeasConfig information element (IE) in accordance with an example;

FIG. 4 illustrates exemplary code describing another example of a modified MeasConfig information element (IE) in accordance with an example;

Figure 5:
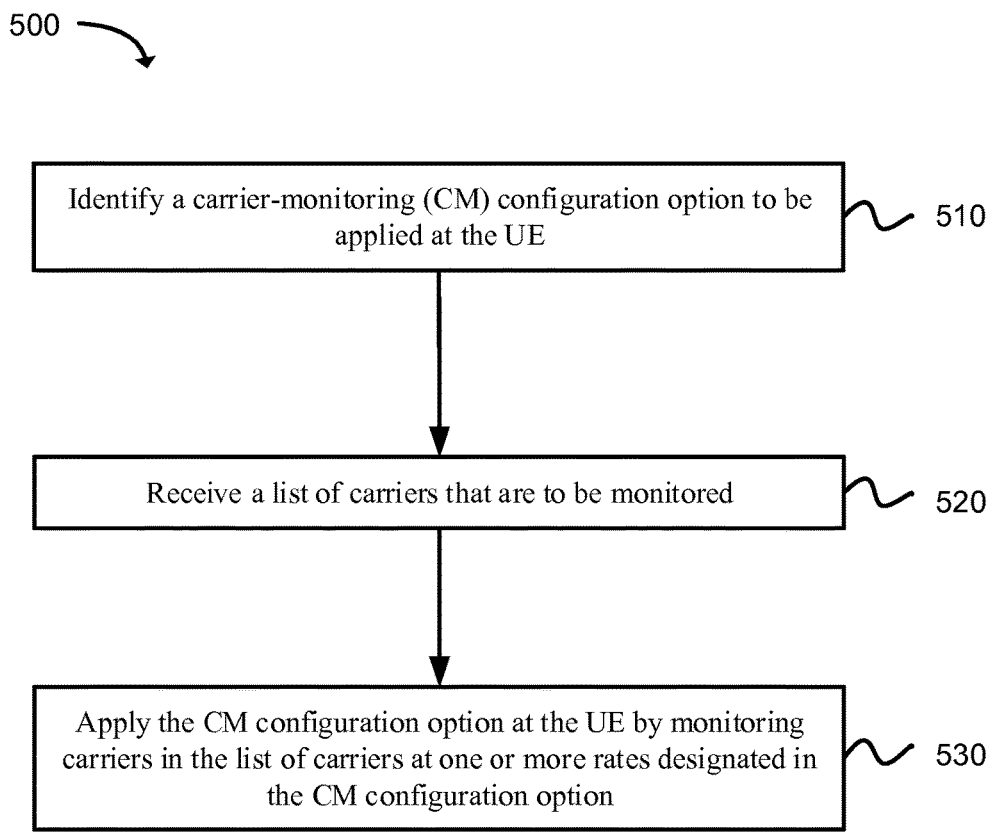
FIG. 5 is a flow chart that illustrates exemplary functionality of an apparatus of a user equipment (UE) in accordance with an example.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

For Third-Generation-Partnership-Project (3GPP) Long-Term-Evolution (LTE) release 12 (rel-12) (and likely for future releases), the Radio-Access-Network-1 (RAN2) Working Group (WG) has agreed to introduce measurement capabilities that allow user equipments (UEs) to monitor an increased number of carriers. This capacity to monitor an increased number of carriers can be referred to as the increased-number-of-frequencies-to-monitor (IncMon) feature. The RAN2 WG has also agreed that separate capability bits will be defined for Universal-Mobile Telecommunications-System (UMTS) measurements and LTE measurements, respectively. However, no agreement has been reached regarding whether these bits will be split to distinguish different modes and whether the feature of monitoring an increased number of carriers will be optional.

The Radio-Access-Network-1 (RAN4) Working Group (WG) has increased the minimum number of inter-frequency carriers and cells that a user equipment (UE) is able to monitor in all radio-resource-control (RRC) states for LTE and UMTS. Signaling extensions have been defined in order to enable more carriers to be measured and for these additional measurements to be reported. For example, a new type of System Information Block (SIB) called a SIB11ter has been introduced in UMTS to enable the broadcast of additional inter-frequency neighbors on UMTS carriers. Dedicated signaling can be similarly used.

A network that supports the IncMon feature may signal if a carrier should be measured with reduced measurement performance. The network can also provide a scaling factor indicating an amount of time that a UE is to spend making measurements on a reduced-measurement-performance (RP) carrier. A carrier for which reduced measurement performance is not signaled, by contrast, is measured at a predefined rate designated for normal-measurement-performance carriers. Hence, a rel-12 UE that supports monitoring an increased number of carriers can perform measurements on legacy carriers at the same rate as legacy UEs (e.g., UEs conforming to 3GPP release 11 (rel-11)). However, a rel-12 UE can also perform measurements on additional carriers at the same rate or at a reduced rate. The scaling factor provided by the network is used to determine the reduced rate. Carriers that are measured at a reduced rate are said to be in a reduced-measurement-performance (RP) group, while carriers measured at the normal rate are said to be in the normal-measurement-performance (NP) group.

The maximum time period in between carrier measurements in 3GPP rel-11 (i.e., the measurement reporting delay) can be referred to as $T_{Identify\_Inter\_r11}$, while the maximum measurement reporting delay for rel-12 can be referred to as $T_{Identify\_Inter\_r12}$. The quantity $T_{Identify\_Inter\_r11}$ defined by the following equation:

$$T_{Identify\_Inter\_r11} = \frac{T_{Basic\_Identify\_Inter} * 480}{T_{Inter1}} * N_{freq}$$

$T_{Basic\_Identify\_Inter}$ is the maximum allowed time for a UE to identify a new Frequency Division Duplexing (FDD) inter-frequency cell and $T_{inter1}$ is the minimum available time for inter-frequency and inter-RAT measurements during a 480 millisecond (ms) period. $N_{freq}$ refers to the number of frequencies to monitor. The quantity $T_{Identify\_Inter\_r12}$ includes a scaling factor (S) and is defined by the following equation:

$$T_{Identify\_Inter\_r12} = \frac{S}{S-1} * \frac{T_{Basic\_Identify\_Inter} * 480}{T_{Inter1}} * N_{freq}$$

The RAN4 WG has agreed that Code-Division-Multiple-Access 2000 (CDMA2000) and Global System for Mobiles (GSM) will be included in only the NP group, so no additional signaling is needed for CDMA2000 or GSM layers. The RAN4 WG has also agreed that is should be possible to indicate many different combinations of normal and reduced-performance carriers. The RAN4 WG has also opined that that it would be beneficial to have a default rule indicating which carriers belong to the NP group and which carriers belong to the RP group for cases in which a Universal Terrestrial Radio Access Network (UTRAN) does not provide any signaling related to the increased-number-of-frequencies-to-monitor (IncMon) feature.

The scaling factor and the indication of which carriers belong to which performance group needs is needed for UEs in modes such as Universal-Terrestrial-Radio-Access (UTRA) idle, UTRA cell Paging Channel (PCH), UTRA UTRAN Registration Area (URA) PCH, UTRA cell Forward Access Channel (FACH), UTRA Dedicated Channel (DCH), E-UTRA idle, and E-UTRA connected. For UEs in UTRA idle, UTRA CELL PCH, UTRA URA PCH, or LTE idle states, the RAN4 WG does not anticipate that the scaling factor will need to be configured by higher-layer signaling.

For UEs in a UTRA cell FACH mode and UEs in a UTRA cell DCH mode, the RAN4 WG anticipates that at most four scaling factors per mode would be need to be provided for UTRA carriers in the RP group. Up to four scaling factors can be explicitly signaled and an additional default value can be used for carriers for which a scaling factor is not explicitly signaled.

For UEs in E-UTRA Radio-Resource-Control (RRC) connected mode, the RAN4 WG anticipates that at most four scaling factors would be needed. Up to four scaling factors can be explicitly signaled and an additional default value can be used for carriers for which a scaling factor is not explicitly signaled. In one example, there may be two different scaling factors with values of 8 and 16. The same scaling factors may be applied to both UTRA and E-UTRA.

The RAN4 WG intends to specify mappings between scaling factors and measurement performance in 3GPP Technical Specifications (TSs) 25.133 and 36.133. The following scaling factors are presumptively mapped to performance requirements: SCALING_FACTOR_UTRA_CONFIG1, SCALING_FACTOR_UTRA_CONFIG2, SCALING_FACTOR_UTRA_CONFIG3, SCALING_FACTOR_UTRA_CONFIG4, SCALING_FACTOR_EUTRA_CONFIG1, SCALING_FACTOR_EUTRA_CONFIG2, SCALING_FACTOR_EUTRA_CON-FIG3, and SCALING_FACTOR_EUTRA_CONFIG4. Only one scaling factor is used by a UE at any one time.

There are currently two choices available for a default configuration. The first choice, referred to as Mode 1, calls for all carriers to be included in the NP group. Mode 1 can reduce overall average measurement delay.

In the second choice, referred to as Mode 2, a pre-configured number of carriers can be assigned to the normal-measurement performance group and a set of scaling factors can be provided for carriers in the RP group; the pre-configured number and the scaling factors can be provided in the 3GPP specification. The NP and RP groups can be determined based on the order of a predefined ordered list. For example, if the preconfigured number of carriers is three, the first three carriers on the predefined ordered list can be assigned to the NP group. Any remaining carriers in the predefined ordered list can be assigned to the RP group. Mode 2 can reduce signaling overhead while allowing some carriers to be included in a RP group.

There are advantages that can be gained by using default configurations in rel-12 networks. However, a problem arises when a UE that complies with 3GPP rel-12 is to be used with an older network, such as a network that only conforms to 3GPP rel-11 (or an earlier release). A rel-11 network does not support the IncMon feature. As a result, if a rel-12 UE applies a default configuration specified in the rel-12 when no IncMon signaling is received from the rel-11 network, the rel-12 UE will follow the rel-12 delay requirement. The rel-12 delay requirement, however, may not satisfy the rel-11 delay requirement.

Systems and methods in accordance with the present disclosure provide several different carrier-monitoring (CM) configuration options and signaling approaches that can be used by networks and/or devices conforming to the 3GPP rel-12 standard (and possibly for subsequent releases). In some embodiments, the IncMon feature can be optional rather than mandatory in order to accommodate UEs that do not support the IncMon feature.

In a first CM configuration option (option 1), mode 1 can be used as the default configuration. In option 2, mode 1 can be used as the default configuration and mode 2 can also be adopted as a configurable configuration. In option 3, mode 2 can be used as the default configuration. In option 4, mode 2 can be used as the default configuration and mode 1 can also be adopted as a configurable configuration. In option 5, both mode 1 and mode 2 can be adopted as configurable configurations and neither mode is used as a default. For any of the options 1-5, network signaling can be introduced to indicate which configuration should be used by a UE.

FIG. 1 illustrates exemplary code describing an example of a modified Measurement-Configuration (MeasConfig) information element (IE) 100. The MeasConfig IE can be used to signal a default IncMon configuration that is used in a network. The MeasConfig IE 100, in general, specifies measurements to be performed by the UE and covers intra-frequency, inter-frequency, and inter-Radio-Access-Technology (inter-RAT) mobility as well as configuration of measurement gaps. A variable identifying the default configuration for the IncMon feature can be added to the MeasConfig IE. As shown in selection 102, the variable can be named defaultConfigIncMon-v12xy (though other names are possible). The MeasConfig IE 100 and the defaultConfigIncMon-v12xy variable can be included in a measurement-configuration (MC) communication sent from the network to the UE in order to inform the UE of which mode (e.g., mode 1 or mode 2, as in option 1 or option 3, respectively) should be used as a default configuration. The MC communication can comprise a Radio-Resource-Control (RRC) reconfiguration message.

A MeasConfig IE can comprise a MeasObjectToAddModList IE. The MeasObjectToAddModList IE can, in turn, comprise a list of measurement objects for one or more RATs (e.g., E-UTRAN, UTRAN, GSM/Enhanced Data rates for Global Evolution (EDGE) Radio Access Network (GERAN), CDMA2000). The measurement object for to E-UTRAN, for example, is known as the measObjectEUTRA IE. The list of measurement objects can comprise a list of carriers that are to be monitored.

FIG. 2 illustrates a table 200 containing exemplary field descriptions for the measObjectEUTRA IE. As shown in selection 202, a field description can be included for the defaultConfigIncMon-v12xy variable for documentation purposes.

FIG. 3 illustrates exemplary code describing another example of a modified MeasConfig IE 300. The MeasConfig IE 300 can be used to inform a UE regarding both a default IncMon configuration and a pre-configured IncMon configuration that are used in a network. The MeasConfig IE 300, in general, specifies measurements to be performed by the UE and covers intra-frequency, inter-frequency, and inter-Radio-Access-Technology (inter-RAT) mobility as well as configuration of measurement gaps. As shown in selection 302, a variable named defaultConfigIncMon-v12xy and a variable named preConfigIncMon-v12xy can be included in the MeasConfig IE 300 (although other names are possible). The MeasConfig IE 300, the defaultConfigIncMon-v12xy variable, and the preConfigIncMon-v12xy variable can be included in a measurement-configuration (MC) communication sent from the network to the UE in order to inform the UE of which mode (e.g., mode 1 or mode 2, as in option 2 or option 4) should be used as a default configuration and which mode should be used as an alternative adopted configuration. The MC communication can comprise a Radio-Resource-Control (RRC) reconfiguration message.

FIG. 4 illustrates exemplary code describing another example of a modified MeasConfig IE 400. The MeasConfig IE 400 can be used to inform a UE regarding two configurable IncMon configurations that are used by a network. The MeasConfig IE 400, in general, specifies measurements to be performed by the UE and covers intra-frequency, inter-frequency, and inter-Radio-Access-Technology (inter-RAT) mobility as well as configuration of measurement gaps. As shown in selection 402, a variable named configIncMon-v12xy can be included in the MeasConfig IE 400 (though other names are possible). The MeasConfig IE 400 and the configIncMon-v12xy variable can be can be included in a measurement-configuration (MC) communication sent from the network to the UE in order to inform the UE of which of the adopted modes (e.g., mode 1 or mode 2, as in option 5) should be used, where neither mode is used as a default configuration. The MC communication can comprise a Radio-Resource-Control (RRC) reconfiguration message.

FIG. 5 illustrates exemplary functionality 500 of an apparatus of a user equipment (UE) that supports the IncMon feature. The functionality can be implemented as a method or the functionality can be executed as instructions on a machine, where the instructions are included on at least one computer readable medium or one non-transitory machine readable storage medium. The UE can comprise, for example, one or more antennas, one or more processors, and a transceiver. As in block 510, circuitry at the UE (e.g., a transceiver) can identify a carrier-monitoring (CM) configuration option applied at the UE. In some examples, the circuitry can receive a measurement-configuration (MC) communication that comprises the CM configuration option from an evolved node B (eNB) via the one or more antennas. The CM configuration option can comprise any of the options 1-5, as explained above, and can comprise a default configuration and/or one or more adopted configurations. A default configuration and/or an adopted configuration can comprise mode 1 or mode 2, as explained above. In some embodiments, the MC communication can comprise a feature in a measurement-configuration (MeasConfig) information element. If the CM configuration option comprises only a default configuration and not an adopted configuration, the CM configuration option can be predefined in a technical specification to which the UE conforms and therefore does not have to be received in an MC communication.

As in block 520, circuitry at the UE (e.g., a transceiver) can also receive a list of carriers that are to be monitored via the one or more antennas. As in block 530, circuitry at the UE (e.g., one or more processors) can apply the CM configuration option at the UE by monitoring carriers in the list of carriers at one or more rates designated in the CM configuration option. In some examples, circuitry can also identify UE-capability information that comprises six bits. One bit in the six bits can correspond to a default configuration, another bit in the six bits can correspond to an adopted configuration, and four bits in the six bits can correspond to four respective configurable configurations in different radio access technologies (RATs). The circuitry at the UE (e.g., a transceiver) can send the UE-capability information to the eNB via the one or more antennas. In some examples, the circuitry at the UE can also be configured to receive an IncMon-support message from the eNB indicating whether the eNB supports the IncMon feature. If no IncMon message is received, the circuitry at the UE (e.g., one or more processors) can be configured to apply a default CM configuration. The default CM configuration may be pre-defined in a technical specification. The UE-capability information can be sent using radio-resource control signaling.

Figure 6:
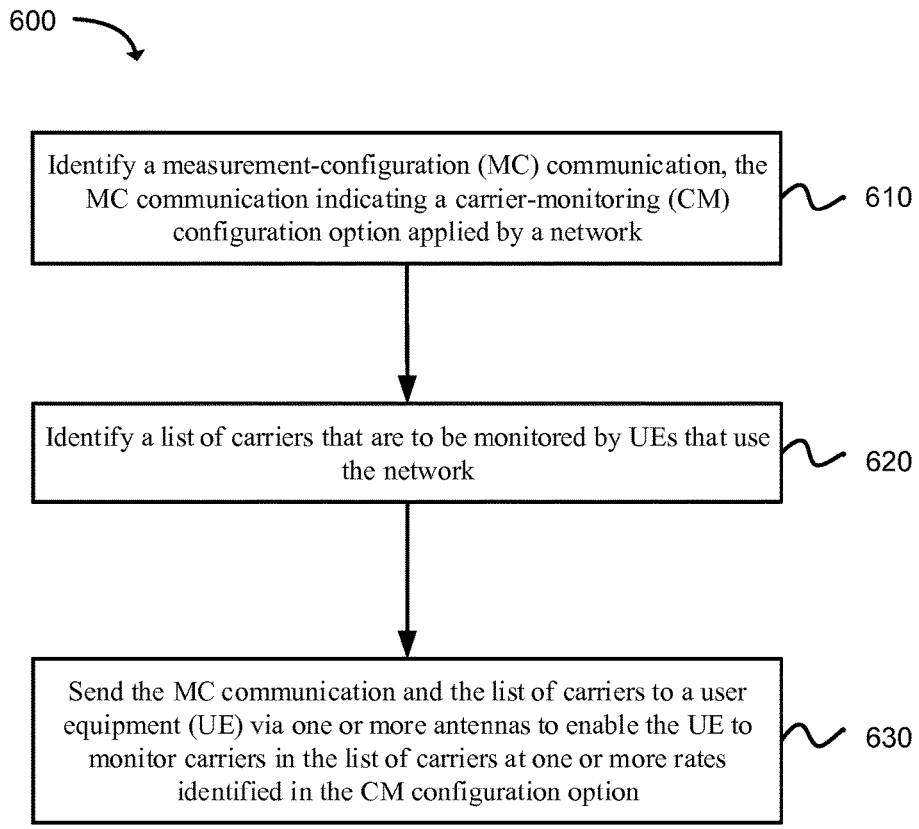
FIG. 6 is a flow chart that illustrates exemplary functionality of an apparatus of an evolved Node B (eNB) in accordance with an example.

FIG. 6 illustrates exemplary functionality 600 of an apparatus of an evolved Node B (eNB) that supports the IncMon feature. The functionality can be implemented as a method or the functionality can be executed as instructions on a machine, where the instructions are included on at least one computer readable medium or one non-transitory machine readable storage medium. The eNB can comprise, for example, one or more antennas, one or more processors, and a transceiver. As in block 610, circuitry at the eNB (e.g., one or more processors) can identify a measurement-configuration (MC) communication, the MC communication indicating a carrier-monitoring (CM) configuration option applied by a network. The CM configuration option can comprise any of the options 1-5, as explained above, and can comprise a default configuration and/or one or more adopted configurations. A default configuration and/or an adopted configuration can comprise mode 1 or mode 2, as explained above.

For example, the CM configuration option can comprise a default configuration, The default configuration can comprise a mode (mode 1) in which all carriers in the list of carriers are monitored at a predefined rate. In another example, the default configuration can comprise a mode (mode 2) in which carriers in the list of carriers are assigned to either a normal-performance (NP) group or a reduced-performance (RP) group, wherein carriers assigned to the NP group are monitored at a predefined rate and carriers in the RP group are monitored at a reduced rate based on one or more scaling factors.

In another example, the CM configuration option can also comprise one or more adopted configurations. For example, one of either mode 1 or mode 2 can be an adopted configuration while the other respective mode can be a default configuration. In another example, both mode 1 and mode 2 can be adopted configurations.

As in block 620, circuitry at the eNB (e.g., one or more processors) can identify a list of carriers that are to be monitored. As in block 630, circuitry at the eNB (e.g., a transceiver) can send the MC communication and the list of carriers to a user equipment (UE) via the one or more antennas. The MC communication and/or list of carriers may be sent via dedicated signaling or via a broadcast signaling.

Figure 7:
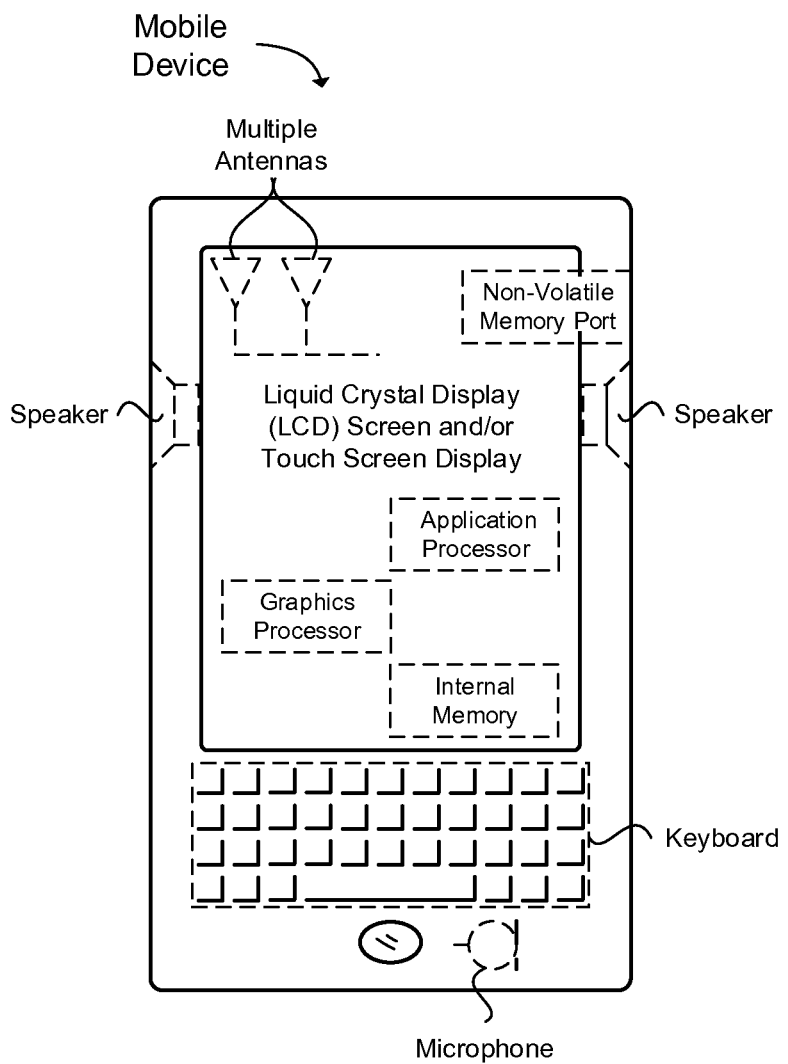
FIG. 7 provides an example illustration of a wireless device in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment of the present disclosure. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present disclosure can be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the described herein. One skilled in the relevant art will recognize, however, that some embodiments can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. An apparatus of a user equipment (UE), the apparatus comprising circuitry configured to:
   identify a carrier-monitoring (CM) configuration option to be applied at the UE;
   receive a list of carriers that are to be monitored via the one or more antennas;
   apply the CM configuration option at the UE by monitoring carriers in the list of carriers at one or more rates designated in the CM configuration option;
   receive a measurement configuration (MC) communication from an evolved Node B (eNB) via one or more antennas, the MC communication comprising the CM configuration option, wherein the CM configuration option comprises a default configuration and an adopted configuration;
   identify UE-capability information, the UE-capability configuration comprising six bits; and
   send the UE-capability information to the eNB via the one or more antennas, wherein one bit in the UE-capability information corresponds to the default configuration, one bit corresponds to the adopted configuration, and four bits correspond to four respective configurable configurations in different radio access technologies (RATs).

2. The apparatus of claim 1, wherein the CM configuration option comprises a default configuration.

3. The apparatus of claim 2, wherein the default configuration is predefined in a technical specification to which the UE is configured to conform.

4. The apparatus of claim 2, wherein the default configuration comprises a mode (mode 1) in which all carriers in the list of carriers are monitored at a single predefined rate.

5. The apparatus of claim 2, wherein the default configuration comprises a mode (mode 2) in which carriers in the list of carriers are assigned to one of a normal-performance (NP) group or a reduced-performance (RP) group, wherein carriers assigned to the NP group are monitored at a predefined rate and carriers in the RP group are monitored at a reduced rate relative to the predefined rate based on one or more scaling factors.

6. The apparatus of claim 1, wherein the CM configuration option comprises an adopted configuration that is not a default configuration.

7. The apparatus of claim 6, wherein the adopted configuration comprises a mode (mode 1) in which all carriers in the list of carriers are monitored at a single predefined rate.

8. The apparatus of claim 6, wherein the adopted configuration comprises a mode (mode 2) in which carriers in the list of carriers are assigned to either a normal-performance (NP) group or a reduced-performance (RP) group, wherein carriers assigned to the NP group are monitored at a predefined rate and carriers in the RP group are monitored at a reduced rate relative to the predefined rate based on one or more scaling factors.

9. The apparatus of claim 1, wherein the MC communication indicates that the UE is to apply the adopted configuration if the UE supports the adopted configuration.

10. The apparatus of claim 1, wherein the CM configuration option comprises a first adopted configuration and a second adopted configuration, and wherein:
    the first adopted configuration comprises a mode (mode 1) in which all carriers in the list of carriers are monitored at a single predefined rate; and
    the second adopted configuration comprises a mode (mode 2) in which carriers in the list of carriers are assigned to either a normal-performance (NP) group or a reduced-performance (RP) group, wherein carriers assigned to the NP group are monitored at the single predefined rate and carriers in the RP group are monitored at a reduced rate relative to the single predefined rate based on one or more scaling factors.

11. The apparatus of claim 1, wherein the MC communication comprises a feature in a measurement-configuration (MeasConfig) information element.

12. The apparatus of claim 1, wherein the circuitry is further configured to receive an increased-number-of-frequencies-to-monitor (IncMon)-support message from the eNB, the IncMon-support message indicating whether the network supports an IncMon feature.

13. The apparatus of claim 12, wherein the circuitry is further configured to apply a default monitoring configuration of the CM configuration option if the circuitry does not receive the IncMon-support message from the eNB.

14. An apparatus of an evolved node B (eNB), the apparatus comprising circuitry configured to:
    identify a measurement-configuration (MC) communication, the MC communication indicating a carrier-monitoring (CM) configuration option applied by a wireless cellular network;
    identify a list of carriers that are to be monitored;
    send the MC communication and the list of carriers to a user equipment (UE) via one or more antennas to enable the UE to monitor carriers in the list of carriers at one or more rates identified in the CM configuration option;

send a measurement configuration (MC) communication to the UE via one or more antennas, the MC communication comprising the CM configuration option, wherein the CM configuration option comprises a default configuration and an adopted configuration;

identify UE-capability information, the UE-capability configuration comprising six bits; and receive the UE-capability information from the UE via the one or more antennas, wherein one bit in the UE-capability information corresponds to the default configuration, one bit corresponds to the adopted configuration, and four bits correspond to four respective configurable configurations in different radio access technologies (RATs).

15. The apparatus of claim 14, wherein the CM configuration option comprises a default configuration.

16. The apparatus of claim 15, wherein the default configuration comprises a mode (mode 1) in which all carriers in the list of carriers are monitored at a predefined rate.

17. The apparatus of claim 15, wherein the default configuration comprises a mode (mode 2) in which carriers in the list of carriers are assigned to either a normal-performance (NP) group or a reduced-performance (RP) group, wherein carriers assigned to the NP group are monitored at a predefined rate and carriers in the RP group are monitored at a reduced rate based on one or more scaling factors.

18. The apparatus of claim 14, wherein the CM configuration option comprises an adopted configuration.

19. The apparatus of claim 18, wherein the adopted configuration comprises a mode (mode 1) in which all carriers in the list of carriers are monitored at a predefined rate.

20. The apparatus of claim 18, wherein the adopted configuration comprises a mode (mode 2) in which carriers in the list of carriers are assigned to either a normal-performance (NP) group or a reduced-performance (RP) group, wherein carriers assigned to the NP group are monitored at a predefined rate and carriers in the RP group are monitored at a reduced rate based on one or more scaling factors.

21. A non-transitory computer-readable medium storing instructions thereon which, when executed by one or more processors, perform the following:

receiving a measurement-configuration (MC) communication from a cellular base station via one or more antennas, the MC communication indicating a carrier-monitoring (CM) configuration option to be applied at the UE, the CM configuration option comprising a default configuration;

receiving a list of carriers that are to be monitored via the one or more antennas from the cellular base station; and applying the CM configuration option at the UE by monitoring carriers in the list of carriers at one or more rates designated in the CM configuration option in accordance with the MC communication;

receive a measurement configuration (MC) communication from the cellular base station via one or more antennas, the MC communication comprising the CM configuration option, wherein the CM configuration option comprises a default configuration and an adopted configuration;

identify UE-capability information, the UE-capability configuration comprising six bits; and send the UE-capability information to the cellular base station via the one or more antennas, wherein one bit in the UE-capability information corresponds to the default configuration, one bit corresponds to the adopted configuration, and four bits correspond to four respective configurable configurations in different radio access technologies (RATS).

22. The non-transitory computer-readable medium of claim 21, wherein the default configuration comprises either:

a mode (mode 1) in which all carriers in the list of carriers are monitored at a single predefined rate; or a mode (mode 2) in which carriers in the list of carriers are assigned to one of a normal-performance (NP) group or a reduced-performance (RP) group, wherein carriers assigned to the NP group are monitored at a predefined rate and carriers in the RP group are monitored at a reduced rate relative to the predefined rate based on one or more scaling factors.

23. The non-transitory computer-readable medium of claim 22, wherein the CM configuration option further comprises an adopted configuration and the adopted configuration comprises:

mode 2, if the default configuration comprises mode 1; and mode 1, if the default configuration comprises mode 2.

* * * * *